(12) United States Patent
McComb et al.

(10) Patent No.: US 7,881,347 B2
(45) Date of Patent: Feb. 1, 2011

(54) HYBRID GAIN GUIDING IN LASER RESONATORS

(75) Inventors: Timothy McComb, Orlando, FL (US); Martin Richardson, Geneva, FL (US); Vikas Sudesh, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 72 days.

(21) Appl. No.: 12/032,081

(22) Filed: Feb. 15, 2008

(65) Prior Publication Data
US 2008/0198879 A1 Aug. 21, 2008

Related U.S. Application Data

(60) Provisional application No. 60/901,761, filed on Feb. 16, 2007.

(51) Int. Cl.
*H01S 3/30* (2006.01)
(52) U.S. Cl. .............................. 372/6; 372/71; 372/75
(58) Field of Classification Search ...................... 372/6
See application file for complete search history.

(56) References Cited

U.S. PATENT DOCUMENTS

| | | | |
|---|---|---|---|
| 6,751,241 B2 * | 6/2004 | Davis et al. ..................... | 372/6 |
| 6,751,388 B2 | 6/2004 | Siegman | |
| 2003/0202547 A1 * | 10/2003 | Fermann et al. ................ | 372/6 |

OTHER PUBLICATIONS

A. E. Siegman et al., "Confined propagation and near single mode laser oscillation in a gain guided, index antiguided optical fiber," Appl. Phys. Lett. 89, 251101 (2006).*

Y. Chen, et al., "Experimental demonstration of gain guided lasing in an index antiguiding fiber" Advanced Solid State Photonics Conference, Vancouver, British Columbia, Jan. 2007.

A.E. Siegman, et al., "Confined propagation and near single-mode laser oscillation in a gain-guided index antiguided optical fiber" Appl. Phys. Lett., vol. 89, pp. 1-3, Proof Copy 274650APL (2006).

(Continued)

*Primary Examiner*—Minsun Harvey
*Assistant Examiner*—Xnning Niu
(74) *Attorney, Agent, or Firm*—Brain S. Steinberger; Phyllis K. Wood; Law Offices of Brian S. Steinberger, P.A.

(57) ABSTRACT

Methods and systems for hybrid gain guiding in laser resonators that combines the features of gain guiding and fiber or other types of lasers into a single system. Hybrid gain guiding in laser resonators is not limited to conventional fiber lasers. Any type of gain guided fiber, index guided or anti-guided, is used as an intracavity element to induce loss on high order modes in an otherwise multimode laser system. The gain guided element contributes little gain to the laser oscillator but allows only the lowest order mode to transmit without loss. When the gain guiding fiber length is selected so the loss for a particular cavity mode is greater than the gain, the cavity mode does not lase. Since the gain guiding fiber induces loss for all laser modes other than the lowest order mode it makes sure that the mode one higher than the lowest order mode does not lase and as a result, no other cavity modes lase.

14 Claims, 9 Drawing Sheets

OTHER PUBLICATIONS

A.E. Siegman, "Propagating modes in gain-guided optical fibers" Opt. Soc. Am. A, vol. 20, No. 8, pp. 1617-1628 (2003).

L. Goldberg, et al., :V-groove side-pumped 1.5um fibre amplifier Electron Lett., vol. 33, No. 25, pp. 2127-2129 (1997).

P. Polynkin, et al., "Efficient and scalable side pumping scheme for short high-power optical fiber lasers and amplifiers" IEEE Photonics Tech. Lett., vol. 16, No. 9, pp. 2024-2026 (2004).

J. Ballato, et al., "Optical properties of perfluorocyclobutyl polymers" J. Opt. Soc. Am. B, vol. 20, No. 9, pp. 1838-1843 (2003).

* cited by examiner

HYBRID GAIN GUIDING IN LASER RESONATORS

This application claims the benefit of priority to U.S. Provisional Patent Application No. 60/901,761 filed on Feb. 16, 2007.

FIELD OF THE INVENTION

This invention relates to fiber lasers and, in particular, to methods, systems and apparatus for hybrid gain guiding in laser resonators.

BACKGROUND AND PRIOR ART

Originally proposed by Siegman in his 2003 paper, the concept of gain guiding comes about from the analysis of the V parameter of an optical fiber when the imaginary component of the refractive index is taken into account. The V parameter is the controlling factor in the mode propagation of standard index guiding fibers. Using the V parameter in numerical mode solvers the mode characteristics of an optical fiber or waveguide can be determined. Usually the V parameter is a real number that only takes into account real refractive index. The imaginary component comes about as a result of either loss or gain in the medium that light is propagating through. The V parameter of a waveguide is given by the following equation:

$$V = \frac{2\pi a}{\lambda}\sqrt{(n_0 + \Delta n)^2 - n_0^2} \quad (1)$$

where a is the radius of a fiber-core or half width of a slab waveguide, $n_0$ is the cladding index and $\Delta n$ is the index step between the core and clad. A plane wave propagating in a medium with some gain or loss $\Delta\alpha$ will propagate according to $$e^{-j(\frac{2\pi z}{\lambda}(n_0 + \Delta n)) + \Delta\alpha z}$$

the propagation constant in this expression is rewritten as $$\frac{2\pi(n_0 + \Delta n)}{\lambda} + j\Delta\alpha = \frac{2\pi(n_0 + \Delta n + j(\lambda/2\pi)\Delta\alpha)}{\lambda} = \frac{2\pi(n_0 + \Delta\tilde{n})}{\lambda} \quad (2)$$

where ñ is the complex refractive index step which encompasses both index and gain/loss. With this knowledge, the V parameter is rewritten as the complex V-squared parameter to take into account this gain factor.

$$\tilde{V}^2 = \left(\frac{2\pi a}{\lambda}\right)^2 [(n_0 + \Delta\tilde{n})^2 - n_0^2] \cong \left(\frac{2\pi a}{\lambda}\right)^2 2n_0\left(\Delta n + j\frac{\lambda}{2\pi}\Delta\alpha\right) \quad (3)$$

The approximation holds for small index steps and gain. Using numerical mode solving techniques for optical fibers one can use the V-squared parameter to determine the propagation characteristics of modes in an optical fiber which has both gain and index traits. U.S. Pat. No. 6,751,388 issued to Siegman plots an example of calculations for the first two modes of a fiber. FIG. 1 is a plot showing the mode boundaries and mode propagation regions for the $LP_{01}$ and $LP_{11}$ modes of a cylindrical gain-guiding step-profile in the complex $\Delta n$, $\Delta\alpha$ plane.

As shown in FIG. 1, the propagation of a mode depends upon the value of the index and gain steps. Pure gain guiding can occur in a medium with no index step if the gain term $\Delta\alpha$ is large enough to support the $LP_{01}$ mode shown above the first solid line. A combination of negative or positive index difference between core and cladding and a gain or loss step also allows modes to be supported. The $\Delta\alpha$ axis gives the imaginary part of the V-squared parameter, which can be calculated from the imaginary component of the previous equation. The benefit of gain guiding is that because $\Delta\alpha$ is fairly small, relatively large cores, which are represented by a in the equation (3), is used and single mode oscillation is maintained. In standard index guided fibers the V parameter is fixed, because it is a function of the refractive index and the core size. In gain guided fibers the gain can be changed to compensate for larger cores regardless of the type of glass material used.

Known prior art includes U.S. Pat. No. 6,751,388 titled "Fiber lasers having a complex-valued Vc-parameter for gain-guiding" issued to Siegman on Jun. 15, 2004; Y. Chen, V. Sudesh, M. C. Richardson, M. Bass, J. Ballato, and A. E. Siegman, "Experimental Demonstration of Gain Guided Lasing in an Index Anti guiding Fiber," Advanced Solid State Photonics Conference. Vancouver, British Columbia, January 2007; A. E. Siegman, Y. Chen, V. Sudesh, M. C. Richardson, M. Bass, P. Foy, W. Hawkins, J. Ballato, "Confined propagation and near single mode laser oscillation in a gain guided index antiguided optical fiber," Appl. Phys. Lett., Submitted October 2006; and A. E. Siegman, "Propagating Modes in gain guided optical fibers," J. Opt. Soc. Am. A, vol. 20, pp. 1617-1628, 2003.

Deficiencies of prior art include the fact that similar techniques have been investigated where single mode conventional index guided fibers are spliced onto multimode fibers, but because of the small core size and mismatch they are highly lossy in a laser cavity and can not withstand high output powers. Despite a large promise of emitting a single transverse laser mode from a very large core and conventional index guiding large mode area fibers are limited to core sizes of around 25 microns for single mode operation, resulting in a limitation on the possible power produced in the fibers due to high power densities. Even these complex designs have only been proven to be single mode for sizes of <100 micron core sizes. High power non-fiber based lasers like CO2, solid state crystal or thin disk have difficulty reaching high beam qualities with high powers and other large mode area concepts and designs are far more complex and hence expensive to manufacture including Photonic Crystal Fibers or Chirally Coupled Core fibers etc. Currently work on such complex designs has been limited to silica fiber, which may be disadvantageous for some rare earth ions, like Thulium, which require high doping percentages to work efficiently.

SUMMARY OF THE INVENTION

A primary objective of the invention is to provide new methods, apparatus and systems for using a gain guiding element to reduce the number of or completely remove higher order modes in a multimode laser resonator. Gain-guiding is a new architecture for creating large low order mode areas in fiber lasers.

A secondary objective of the invention is to provide new methods, apparatus and systems for hybrid gain guiding in laser resonators using anti-index guiding to significantly reduce the requirement for the minimum gain. Hybrid Gain Guiding permits the use of gain guiding with conventional large fibers.

A third objective of the invention is to provide new methods, apparatus and systems for pure gain guided fibers incorporating hybrid gain guiding in the laser resonator that uses anti-index guiding to significantly reduce the required threshold gain.

A fourth objective of the invention is to provide new methods, apparatus and systems for a gain guiding technique that works for very large core sizes. If gain guiding can be scaled up to a few millimeters in core size, then gain guiding elements could be integrated into many different types of solid state lasers already in existence.

A fifth objective of the invention is to provide new methods, apparatus and systems for a gain guiding technique with a very large mode area with single transverse laser mode that allows very high powers to be generated in a single mode without causing damage to fiber end facet.

A sixth objective of the invention is to provide new methods, apparatus and systems for pure gain guided fibers that are simple to manufacture fiber design leads to inexpensive fibers so that current fiber manufacturers can easily adopt this design, since materials are exactly the same.

A seventh objective of the invention is to provide new methods, apparatus and systems for pure gain guided fibers that is scalable to work with any glass type or dopant ion that can currently be made into fiber.

A eighth objective of the invention is to provide new methods, apparatus and systems for an all fiber design makes cooling simpler and more efficient; multimode section of the conventional fiber could be long in length relative to pure gain guided section that leads to compact, high power lasers.

A ninth objective of the invention is to provide new methods, apparatus and systems for pure gain guided fibers with core size scalable to sizes of 500 microns or even much larger with single mode oscillation maintained. Lager versions of gain guided fiber can be applied as a cavity element to other, non fiber based laser systems such as liquid, gas or solid state diode or flash lamp pumped systems in order to restrict their operation to single mode.

A first embodiment of the present invention provides a gain guided hybrid laser having a multimode laser resonator with hybrid gain guiding in the multimode laser resonator. The hybrid laser includes a large core multimode fiber as a gain medium for the hybrid laser, a pump source at a first end of the multimode fiber to pump light into a cavity of the multimode fiber laser, a gain guiding element coupled with a second end of the multimode fiber to induce loss on high order modes to allow only one single mode to transmit through the gain guiding element without loss, a main pumping source for pumping the gain guiding element to produce a gain guided laser, wherein the gain guiding provides a single mode output and an output coupler for coupling a single mode output.

A second embodiment provides an end pumped hybrid gain guided laser including a large core multimode fiber as a gain medium, a section of gain guided fiber coupled with a large core multimode fiber, a diode pump source coupled with one end of the multimode fiber and a pump coupler the diode pump source to the multimode fiber, wherein unabsorbed pump light is pumped through an end of the gain guided fiber to induce a gain guiding effect in the large core laser fiber to provide a fiber based system without an external pump module.

A third embodiment provides a multimode laser having a hybrid gain guiding resonator, the laser including plural gain guided fibers coupled at each end with one of plural multimode fibers, the plural gain guided and corresponding multimode fibers coupled together in a zig-zag manner and aligned adjacent to each other as an intracavity element to induce a loss on high order modes, an end pump source connected with an input end of a first one of the multimode fibers for pumping the plural gain guided element without inducing laser oscillations by the light used to pump the gain guided element and a main pump source for pumping the multimode laser intracavity element. In an embodiment, the gain guided fibers are embedded in a clear index matching material.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
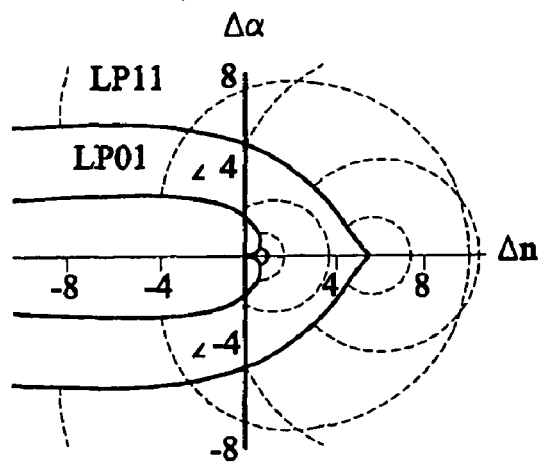
FIG. 1 is a plot showing the mode boundaries and mode propagation regions for the $LP_{01}$ and $LP_{11}$ modes of a cylindrical gain-guiding step-profile in the complex $\Delta n$, $\Delta \alpha$ plane.
Figure 2:
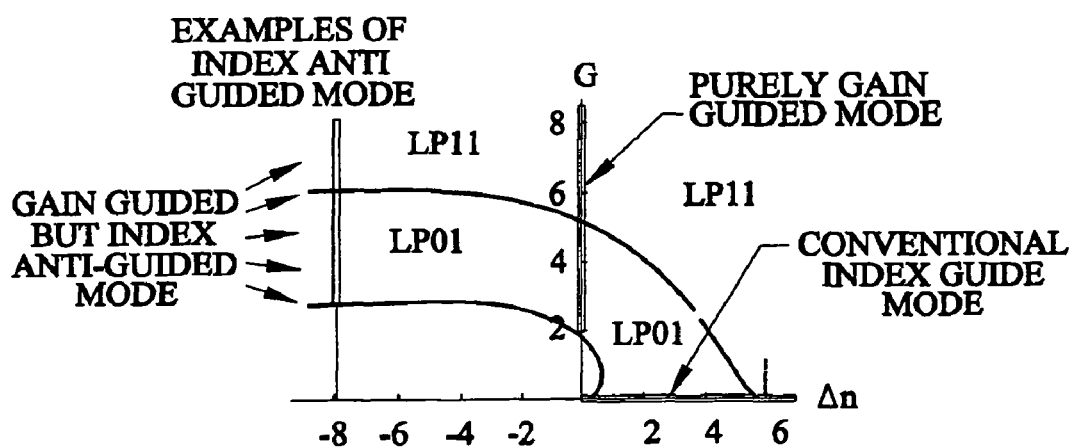
FIG. 2 is a plot showing the propagation regions for $LP_{01}$ and $LP_{11}$ modes of an optical fiber in the complex $\Delta n$, $\Delta \alpha$ plane.

The following is a list of designators used through the specification and drawings to identify element:
400 hybrid laser
410 multimode fiber
420 pump source
430 optical device
440 gain guided element
480 side pump source
490 output coupler
500 end pumped hybrid laser
510 multimode fiber
520 pump source
530 mirror 540 gain guided element
550 pump source
560 coupling optics
570 pump coupler
600 hybrid laser
900 multimode hybrid laser
910 multimode fiber
920 end pump source
925 side pump source
940 gain guided fiber It would be useful to discuss the meanings of some terminology used herein and their applications starting with a description of index anti-guiding. Originally it was thought that only pure gain guiding was plausible, which means that a near zero index step must be created and maintained if the fiber is to gain guide in single mode only which is not an easy feat to produce in the real world. Recently however, it has come to light that strong index anti-guiding works in a laser cavity as disclosed in U.S. Pat. No. 6,751,388 issued to Siegman on Jun. 15, 2004. This means that a fiber can be produced with the opposite index step and not allowing light to propagate in the core. The plot in FIG. 2 shows that single modes can also exist in the index anti-guiding regime.

Figure 3:
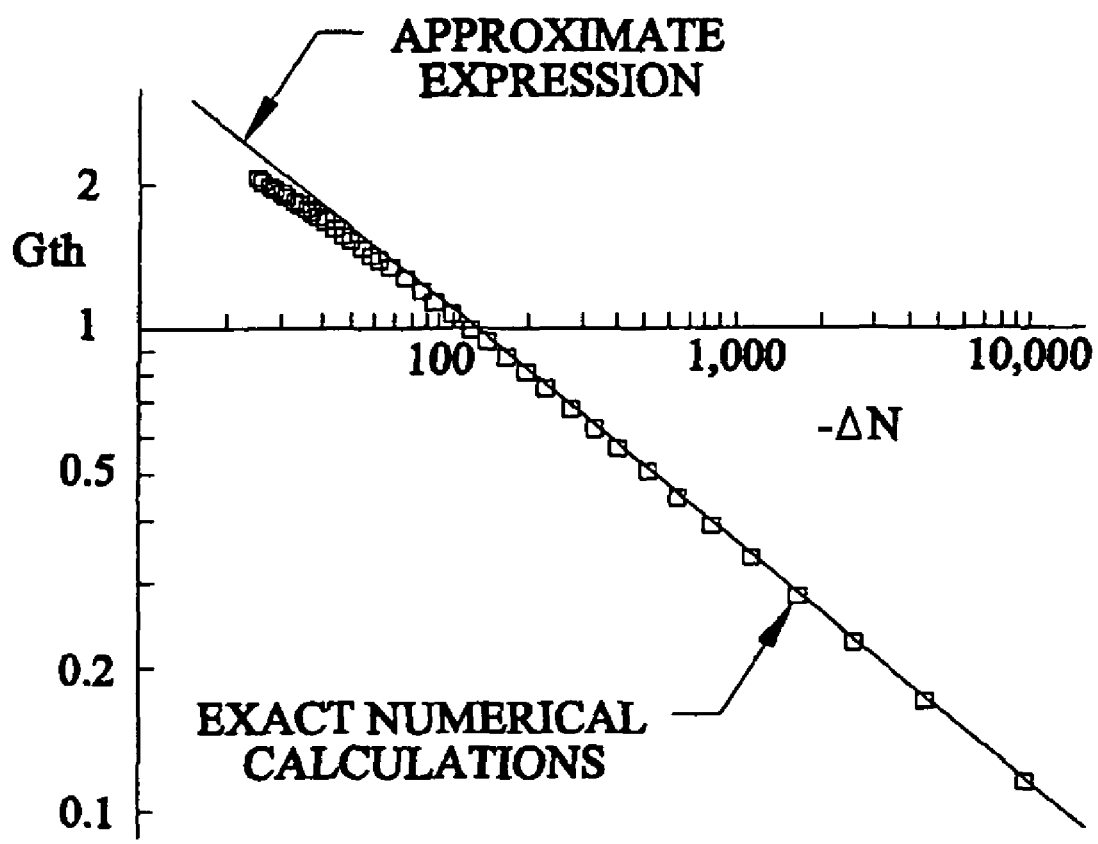
FIG. 3 is a graph showing threshold values of the normalized gain parameter G for the $LP_{01}$ mode in a gain guided index antiguided fiber plotted verses negative values of the index step parameter $\Delta N$.

Further into the negative index guiding regime the threshold gain required is significantly decreased. This is a significant benefit because in pure gain guided fibers it is difficult to dope a fiber with enough ions and be able to pump it hard enough to create the gain guiding effect. Implementing the novel index anti-guiding regime according to the present invention significantly lowers the requirement for the minimum gain, and hence makes gain guiding feasible. FIG. 3 is a graph showing threshold values of the normalized gain parameter G for the lowest order mode $LP_{01}$ in a gain guided index antiguided fiber plotted verses negative values of the index step parameter $\Delta N$. As shown in FIG. 3, as the real part of V-square $-\Delta N$ is increased, the required imaginary V-squared parameter G decreases, meaning far less gain is required to achieve gain guiding. As a result, the index anti-guiding concept allows fibers to be fabricated with reasonable doping levels that can be pumped with reasonable pump powers.

For purpose of example, and not limitation, a flash-lamp pumped gain guided index antiguided fiber laser was is described with a single mode, $M^2$ at approximately 1.5 laser action in an approximately 10% trivalent Neodymium $Nd^{3+}$ doped and approximately 1% $Nd^{3+}$ doped, phosphate glass fiber with varying core diameters from approximately 100 μm to approximately 400 μm. In this example, the fiber has a strong index antiguiding with a $-\Delta N$ greater than approximately 1256. The 10% $Nd^{3+}$ fiber had an approximately 250 μm cladding with an approximately 100 μm core, whereas 1% $Nd^{3+}$ doped fiber had core diameter varying from approximately 100 μm to approximately 400 μm in approximately 100 μm steps. In the example with 1% $Nd^{3+}$ doped fiber the cladding was approximately 1.67 times the core diameter, the length of the fiber was approximately 13 cm and only approximately 10 cm was pumped by the lamp. The length of fiber was placed inside a capillary tube and the tube was placed inside a flash-lamp chamber. The laser was pumped with up to approximately 90 J of light from the flash lamp, with a coupling efficiency of less than approximately $3 \times 10^{-4}$. The lamp operated at approximately 1 Hz with a pulse duration of approximately 500 microseconds and an HR at approximately 1050 nm mirror was used as one end of the laser cavity. The other end of the fiber included either an approximately 4% Fresnel reflection or output couplers with varying reflectivity predicted by the model. When placed in the chamber and exposed to pumping, laser action occurred in the fiber.

The output power from the fiber increased at a pump value of approximately 25 J and the spectrum of the laser output narrowed significantly from approximately 10 nm below threshold to approximately 1.0 nm width centered at approximately 1052 nm above the threshold pump value. Relaxation oscillation spikes occurred in the output showing laser action. Using a camera placed at the laser output to observe the beam profile showed that the beam becomes very round and Gaussian in nature, suggesting single mode $LP_{01}$ oscillation in the cavity. When the HR mirror is removed the above phenomena cease indicating laser action. The example showed that the anti-index guiding fiber is lasing at a single mode out of an approximately 100 micron core.

In another example, a diode end pumped gain guiding fiber laser using an approximately 2.5 cm long fiber with an approximately 98% output coupler was produced. The fiber for this example was approximately 1% Nd doped phosphate fiber. The core size of this laser was approximately 200 microns and single mode lasing was achieved in accordance with the previously laid out theory on gain guiding. Further additional flash lamp pumped work was done with fibers of up to 400 microns in core diameter. The only limitation to core size of fibers in this experiment was the actual availability of the fiber itself. Both experiments were used to develop a model for selecting the output coupling of a gain guided fiber laser. In gain guided fiber lasers managing the gain is important, and as a result the only way to control the gain of a given length of fiber is to properly select the output coupler to match the laser threshold conditions to those required by gain guiding.

Limitations of Anti-Index Guiding:

There are limitations to the purely index anti guiding gain guiding technique. Chief among the limitations is the pumping scheme. Conventional fibers are pumped through their end by way of dichroic mirrors or fiber Bragg gratings which allow pump light to pass into the fiber while reflecting the signal light. This technique allows for an all fiber based system with high power and compact size. End pumping relies on the so called double clad fiber in which there is a doped core and a glass cladding outside of this core. The cladding has a lower index than the core but higher index than the outside air. As a result of this index profile the glass cladding or "pump cladding" contains the pump light and as the light propagates it is free to pass into and out of the core, thus being absorbed and causing lasing in the core of the fiber. The laser light generated in the core is then confined to the core by the larger index and hence the fiber laser emits from only its core. The end pumping scheme is highly efficient and simple to implement.

The downfall of the index anti-guided gain guiding fiber is that conventional end pumping can not be used because light introduced into the outer cladding can not penetrate the core because of the index step. This means that the only reasonable pump scheme is using a diode bar or flash lamp along the length of the fiber to externally pump the fiber. The need for this to be done removes the benefit of an all fiber system and also causes a great deal of pump inefficiency. Due to reflections and the small size of even a large gain guided fiber core, much of the launched pump light is lost. The small size of the core means that even 500 microns the fiber must be doped highly enough to absorb most of the pump light launched. This means that doping would have to be on the order of approximately 10-20% for such fibers.

Pump schemes must be designed to spread high pump powers over a length of up to a meter, making the laser system far more complex in both materials and alignment compared to a conventional fiber system which is "plug and play" when it comes to launching pump power from a diode delivery fiber to a fiber-laser fiber. Because of pump inefficiencies and the fact that gain guiding fibers are inherently short, since bending can become an issue, heating also becomes a problem. Thermal issues plague purely gain guided fibers since to achieve high powers fibers must deal with hundreds of watts of light over less than a meter of length. High temperature can reduce laser efficiency and even destroy the fiber. This requires water cooling techniques that further lower the feasibility of compact portable gain guiding fiber systems.

In addition to the thermal and pumping difficulties of purely gain guided index anti-guided fiber lasers there are the issues with output coupling to be considered. As was previously described, output coupler selection is key to achieving lasing in a single mode gain guided index anti-guided fiber. This means that relatively high reflectivity output couplers need to be used on fiber lasers that would be more efficient in operation if they used very low reflectivity output couplers. These problems get more severe as core size is increased, as the output coupler reflectivity required for a particular length resonator increases towards upwards of 90%. Because of the high power flux in the cavity, lasers may experience damage faster and will certainly operate in a less efficiency regime.

Hybrid Gain Guiding:

In order to overcome the problems with index anti guided gain guiding or pre gain guiding in general, a hybridized scheme combining the best features of gain guiding and fiber or other types of lasers into a single system is used. The hybrid laser is spawned by, but not limited to, the conventional fiber laser. A gain guided fiber of any type, index guided or anti-guided, is used as an intracavity element to induce loss on high order modes in an otherwise multimode laser system. The gain guided element itself contributes little gain to the laser oscillator, the benefit is in the fact that the gain guided fiber allows only one mode to transmit through it without loss, this is the $LP_{01}$ lowest order mode. When the gain guiding fiber length is selected such that the loss for a particular cavity mode is greater than the gain, it experiences in one round trip that cavity mode is not permitted to lase. Since the gain guiding fiber induces loss for all laser modes other than the lowest order mode it is a simple matter to make sure that the mode one higher than the lowest order mode will not lase and as a result, no other cavity modes are allowed to lase.

The benefits of a hybrid gain guiding configuration are numerous. First, they require very short lengths of gain guiding fiber to be pumped. A two to three centimeter long segment of gain guiding fiber causes enough loss in higher order modes and such a short length of fiber could easily be pumped using the external pumping methods previously described. However, since the majority of pump power would be supplied by conventional waveguide pumping there is minimal thermal or efficiency issues because only a small amount of power is associated with actually making the gain guided segments lossless.

A second benefit is that though these external pumping schemes are not particularly efficient, the laser oscillation is not induced by the light used to pump the gain guiding fiber. Only a small amount of light, enough to induce the gain guiding effect is required. This means thermal issues in the gain guided fiber are also reduced. The main pump light for the cavity is provided through an efficient standard source like cladding pumping in a standard index guided fiber. Hybrid gain guiding also does not rely on the output coupler selection model needed to achieve the proper gain in a purely gain guided resonator. The gain guided section must only be pumped enough to make up for the losses in the lowest order mode. A hybrid laser has the benefit of using the most efficient output coupling, without having to worry about gain guiding effects. In a fiber laser this means that Fresnel reflections with very low reflectivity can be used.

Another benefit of the gain guiding technique is that it works for very large core sizes. If gain guiding is scaled up to a few millimeters in core size, then gain guiding elements could be integrated into many different types of solid state lasers already in existence. In summary, the present invention uses a gain guiding element to reduce the number of or completely remove higher order modes in a multimode laser resonator.

Figure 4:
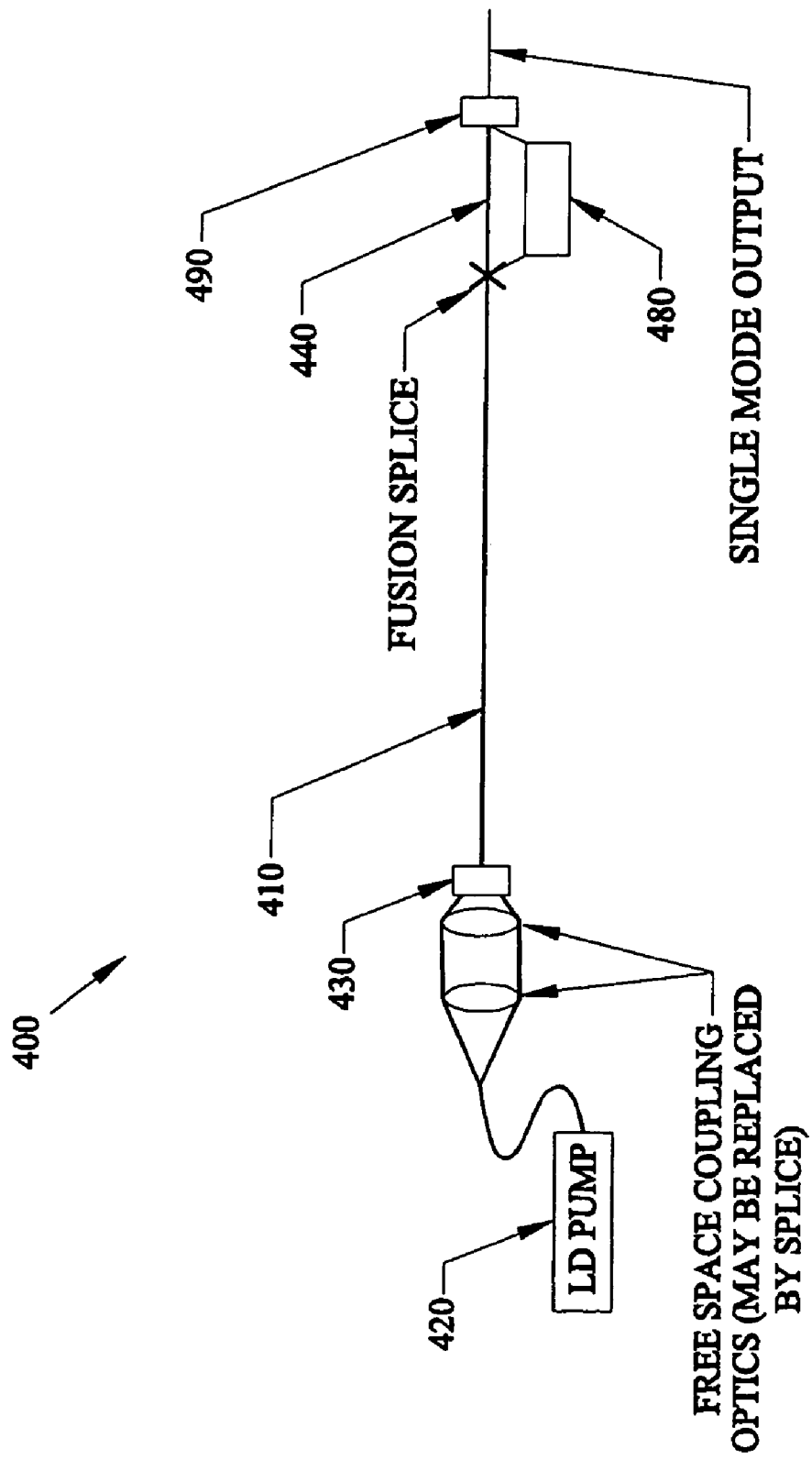
FIG. 4 is a schematic of a hybrid gain guided configuration for a fiber laser.

The most obvious configuration for a gain guided hybrid laser is the laser fiber configuration. The most basic form of a gain guided hybrid laser 400 is shown in FIG. 4. A large core multimode fiber 410 is the gain medium for the hybrid laser. This fiber 410 has a long length, several meters, to provide the desired gain and spread pump light over a long enough length to reduce thermal effects. Pump light 420 is provided through the end using conventional free space or fiber based methods. In the example shown, the pump source 420 is coupled with the multimode fiber via an optical device 430 such as a dichroic mirror or a fiber grating. The long gain medium also allows for the possibility of splicing pump fibers along its length to further increase the pump light in the cavity. The multimode fiber could be conventional fiber or even photonic crystal fiber with an air cladding to improve the pump light coupling and absorption and also improve thermal properties of the fiber by reducing the need for a polymer cladding layer.

The other end of the fiber 410 has a gain guiding element 440 spliced or butt coupled to it to produce the output end of the cavity. An output coupler 490 is coupled at the output end of the gain guided element 440. In an embodiment, a diode bar is coupled across the gain guided element 440 to provide the gain guiding. In a preferred embodiment, the diode bar 480 is a few centimeters long and has a moderate power, approximately 10 watt, line focused diode bar commonly available from the commercial printing industry.

The gain guided section 440 is then pumped in several ways which are described later, typical required absorbed pump powers to produce a gain guided laser are on the order of approximately 2-5 W over a few centimeter length, which is a reasonable amount of power to work with in terms of heating issues in the fiber. As the multimode fiber is scaled up in size, more loss needs to be induced on higher order modes to keep them from lasing. Using multiple short sections of gain guided fiber along the length of the fiber laser is one way to add mode loss on these modes.

While simply using a longer and longer single section of gain guided fiber works, the benefit of using several small sections along the length of the standard fiber is that standard small pump modules can be used, rather than elaborate configurations to use very long lengths. Also the heat caused by the pumping of gain guiding can be dissipated more easily if spread along the fiber length. Additionally the use of several modules allows for the reduction of different modes with each individual module by selecting the module with the proper length and diameter fiber to only induce loss on particular modes.

An alternative fiber pumping configuration is the end pumped configuration. Use of this configuration is based on diode end pumped gain guided fibers being made to lase and gain guide. When a section of gain guided fiber is spliced onto a section of large core conventional fiber it could be pumped through its end with enough power to induce the gain guiding effect. The unabsorbed pump light in the gain guided fiber would then continue to pump the rest of the laser in the standard large core laser fiber. Alternately, the large core conventional fiber could be pumped through the other end, in order to avoid thermal issues in the more highly doped and directly core pumped gain guiding region. The end pumped hybrid gain guided laser configuration is possibly superior to the side pumped configuration because it can be made into a completely all fiber based system where there is no need for external pump modules.

Figure 5:
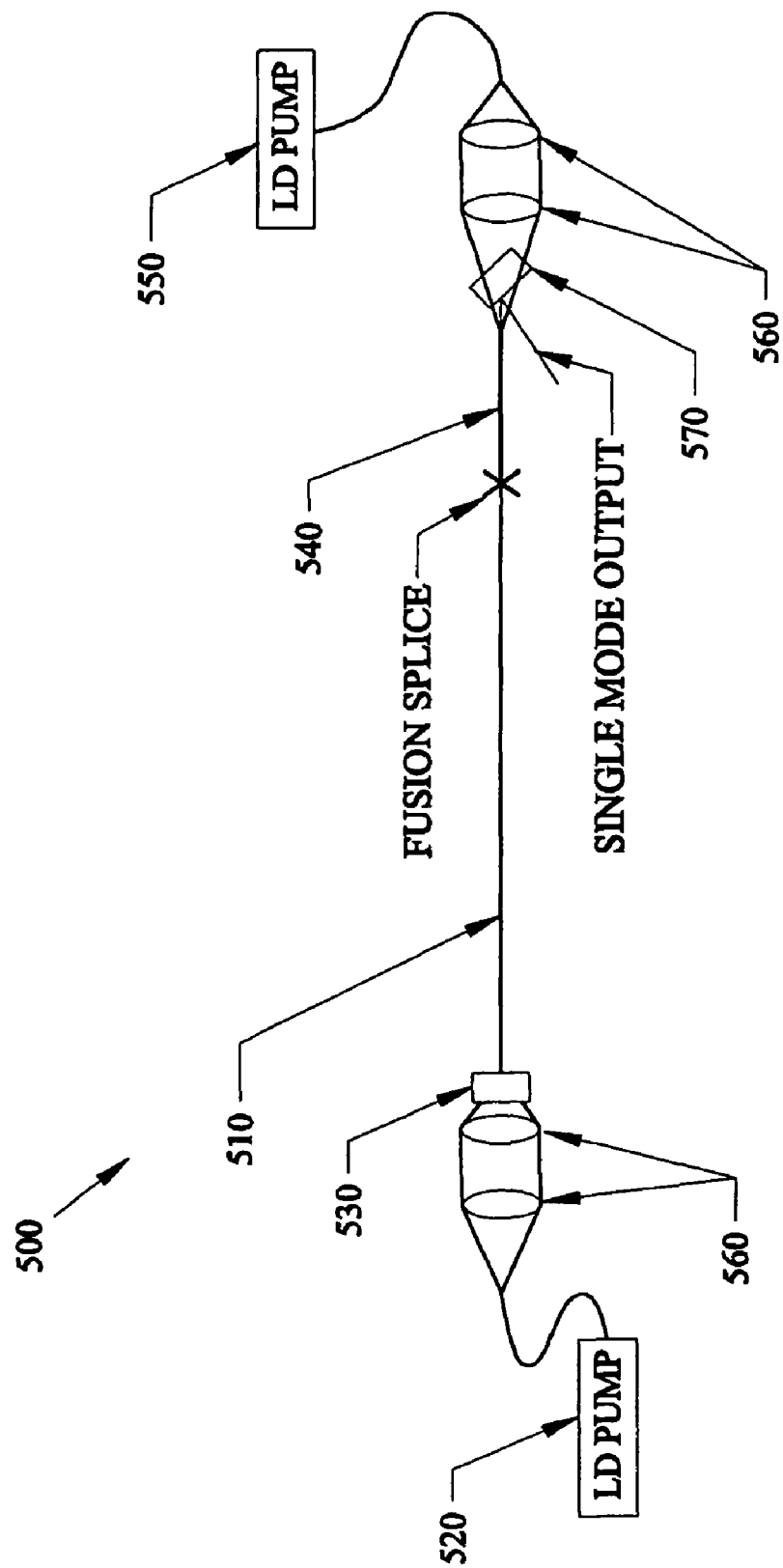
FIG. 5 is a schematic of an end pumped hybrid gain guided laser configuration.

FIG. 5 is a schematic of a free space version of an end pumped hybrid gain guided laser 500 configuration. As shown, the end pumped gain guided hybrid laser 500 includes several meters of large core, rare earth doped, double clad fiber 510 coupled at one end to a pump light source, 520, a high power diode pump in this example, via a diachroic mirror. A section of gain guided fiber 540 to match the core of a standard fiber 510 and force the single mode lasing is spliced with the multimode fiber 510. In a preferred embodiment, the section of gain guided fiber 540 is a few centimeters of same rare earth gain guided fiber with a large core to match the core of a standard fiber and force the single mode lasing. In the example shown, the opposite end of the gain guided fiber 540 is also spliced with a diode pump source. Alternatively, as shown, the splice coupling the pump source with the fiber is replaced with free space coupling optics 560 or a Y-coupler and or fiber gratings. This example also includes a pump coupler or fiber grating 570.

Though fiber lasers are the most current and practical methods to introduce gain guiding into high power lasers systems, the gain guiding technique is by no means limited to a fiber laser. Gain guiding elements can be placed into any type of laser cavity to allow their output to be reduced to single mode. For example, a solid state laser system with a small diameter glass rod or a very large fiber introduced into the cavity with the proper doping characteristics in it to provide gain at the crystal wavelength. This rod is then pumped separately to provide a gain guiding effect in the cavity.

Figure 6:
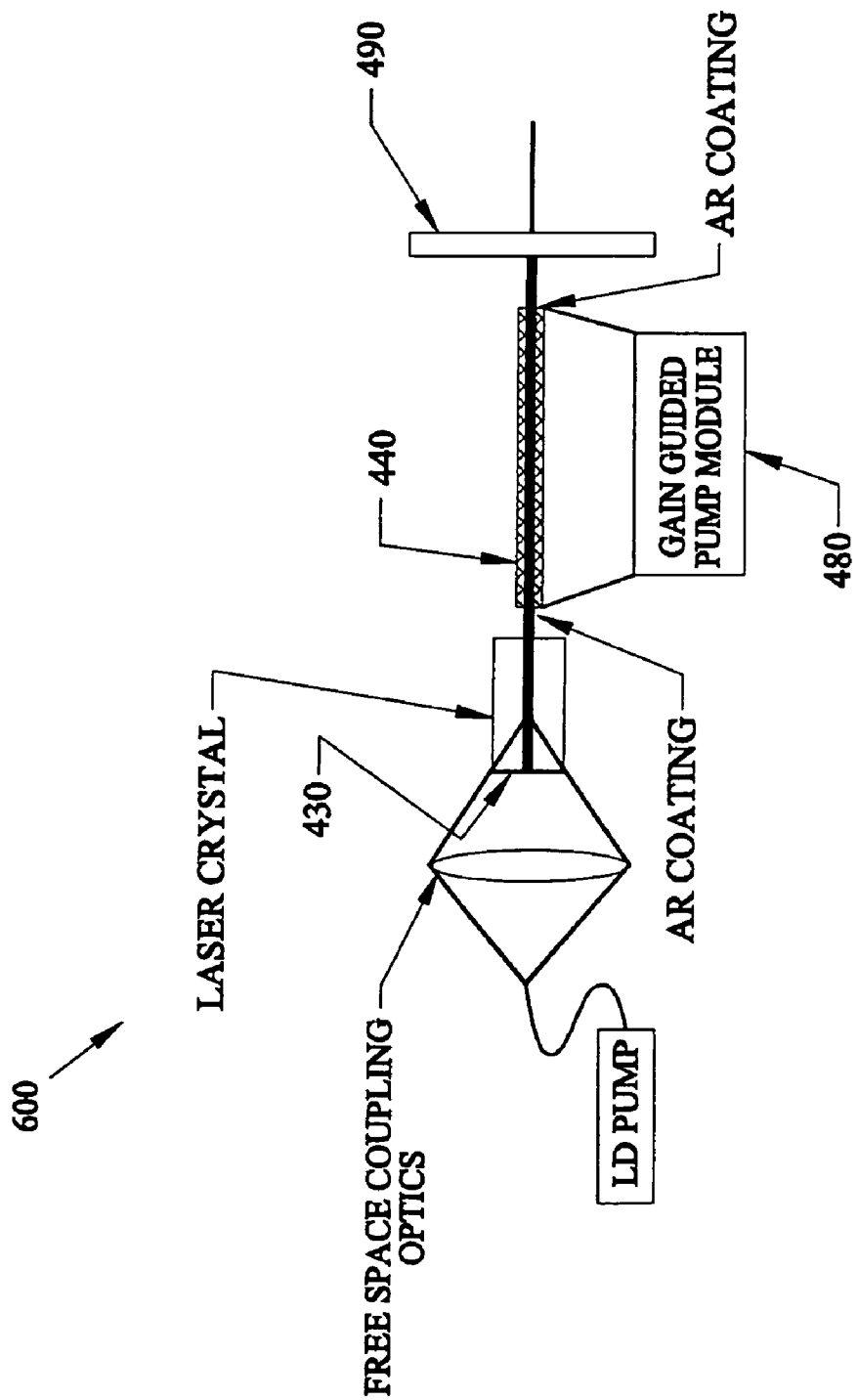
FIG. 6 is a schematic of another alternative hybrid gain guided laser configuration.

FIG. 6 is a simple schematic an alternative hybrid gain guided laser configuration 600. This configuration is not even limited to such a simple cavity as shown in FIG. 6, but rather it could be any arbitrarily complex solid state crystal, ceramic, optically pumped semiconductor, glass, gas or dye based laser cavity. The only requirement is that the gain guiding "rod" needs to have gain at the wavelength of the laser gain medium, it does not have to even be doped with the same ion as the gain medium, as long as enough gain at the laser wavelength exists. This shows the versatility of hybrid gain guiding laser design. It is applicable to virtually any laser cavity that has issues with multimode output assuming the proper gain guiding medium can be designed with the correct materials. In fact, gain guiding is not even limited to fibers or small glass rods, a gain guiding element can be made out of any wave guiding material and gain medium.

Pumping gain guided fiber is a challenge because for low threshold strong gain guiding highly anti index guided fibers are required. A strong anti-index guiding means that light pump light is frustrated from entering the core of the fiber due to total internal reflections, because the index step is opposite what it would normally be in a fiber. The key to the hybrid scheme and the downfall of an all gain guided laser system is the pumping. An all gain guided laser system requires pumping along the length of the gain medium. Which in the case of a fiber, could prove costly and difficult due to length and thermal issues when high powers are desired. The hybrid scheme circumvents this issue with the use of only a short length of gain guided medium. There are several considerations when considering how to pump a gain guided fiber. These include required absorbed power, length required, compactness, and efficiency.

Figure 7:
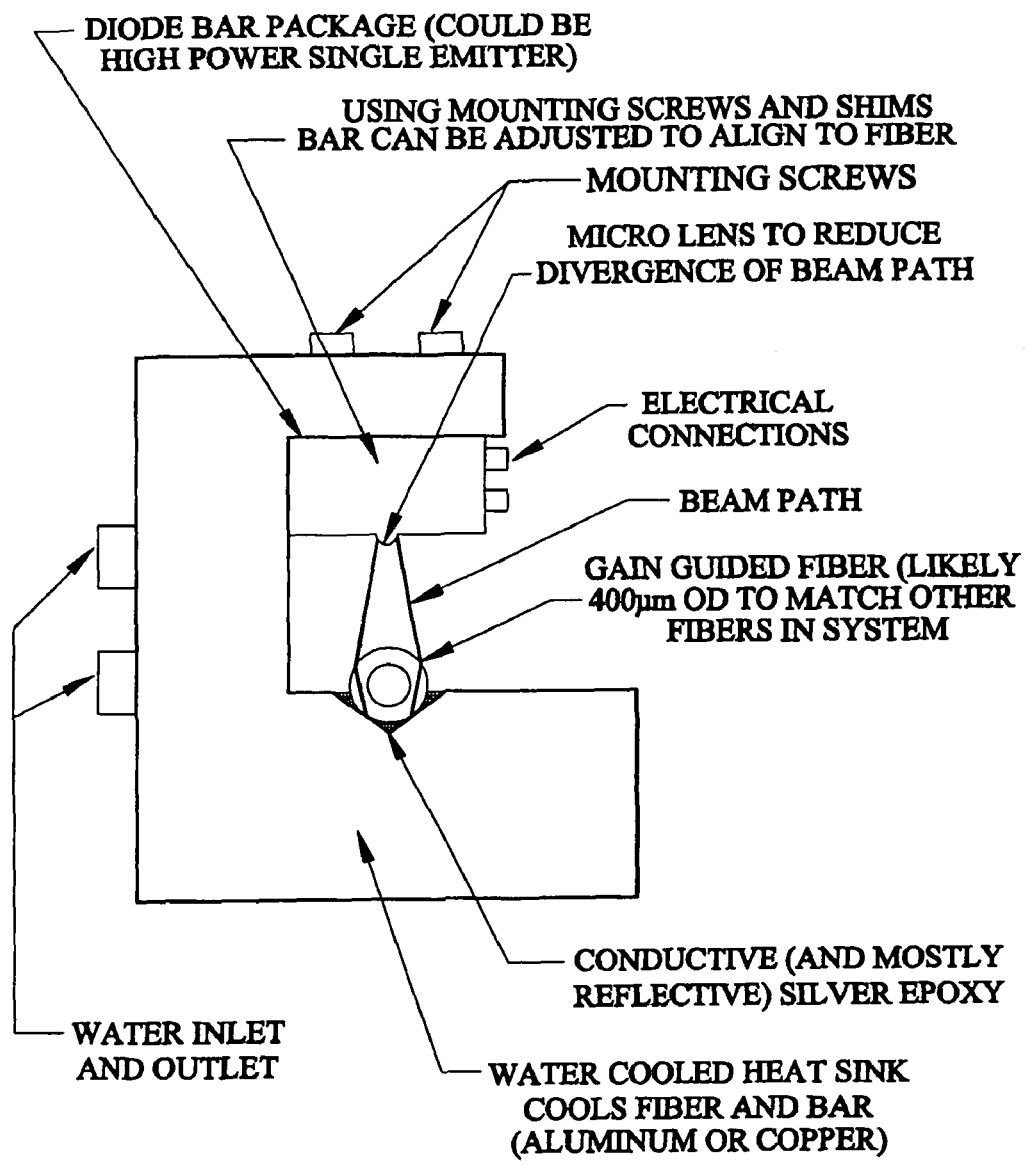
FIG. 7 is a schematic of a gain guided module.

The simplest and most readily available method today is the use of collimated diode bars to pump a few centimeter length of fiber. A "gain guided module" could consist of a mechanical structure to hold and align the bar and fiber which also provides cooling to both the fiber and diode. FIG. 7 is a schematic of an example of a gain guided module.

This module contains a section of gain guided fiber that can be easily spliced or simply butt coupled onto multimode fiber. If a solid state type laser is used the whole module is placed in the laser cavity as an element similar to the way a Q-switched modulator is configured into a cavity. A mirror or fiber grating can be added to the other side of the module to create the resonant cavity in the laser if the Fresnel reflection is not sufficient. The length dimension of the module could be scaled from one centimeter to several depending on the length of the diode bar package. Several 1 cm standard diode bar packages could be lined up to make one long gain guided module, such devices are currently commercially available.

Along with acting as part of a Hybrid system, these modules could be made into free standing moderate power lasers. This results in short gain guided fiber lasers when designed to have a sufficient length with enough pump power mirrors to attain continuous wave lasing. In this example, cooling water is used to cool both the diode bar and gain guided fiber from a single chiller since it is not necessary to run the bar at a very high power to provide the necessary gain for the guiding effect. Calculations for gain guided threshold point to less than 5 W absorbed pump necessary for guiding effect. Water is avoided if a suitably efficient fan/air cooled heat sink is substituted. This would fit well with the laser itself, since the multimode fiber portion of the fiber laser would likely need fairly little cooling if the fiber were over a few meters in length. Because fairly high power in a range of approximately 5 to approximately 7 watt single emitters are commercially available, the diode bar in the schematic is replaced with a single emitter and line generating lens system when it is found that the gain guiding threshold is low enough. This reduces costs and solves some cooling problems. The single emitter would also likely reduce the size of the overall module significantly.

An alternative pumping to direct side pumping is a "pump chamber" technique that involves placing the fiber to be pumped in a hollow cavity which has walls coated with highly reflective materials and which has been properly designed to allow the light to be efficiently absorbed by the fiber. This diffusive chamber technology has been used in the past in bulk solid state and diode lasers where laser rods where pumped using this technique. This technology can be adapted to allow minimal alignment, high efficiency pumping of gain guided index antiguided fibers.

Figure 8:
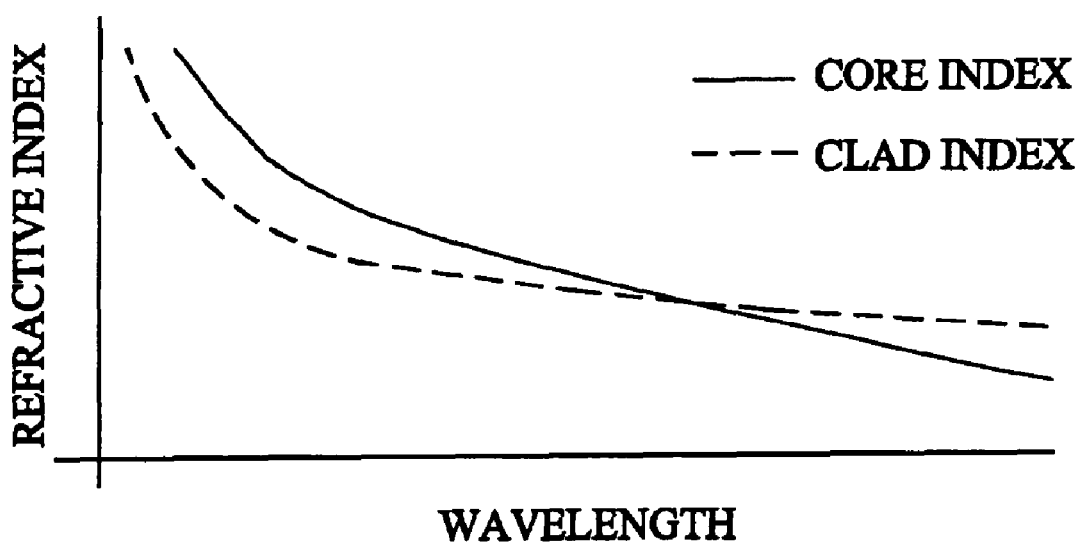
FIG. 8 is a graph showing the refractive index differences for a core index and a clad index over a range of wavelengths.

The pump module provides a gain guided solution for use in any laser cavity system, but there are solutions for pumping gain guided fibers that lend themselves to a purely all fiber system. A consideration for the pumping of both gain guiding and hybrid gain guiding fibers in an all fiber system is the use of a so called crossover index effect. In this effect, a glass with a highly varying dispersion relation is designed as to allow the index dispersions to cross each other allowing the pump light to be conventionally index guided while the signal light would be anti-index gain guided. This requires the core glass index to be higher than the clad glass index at the pump wavelength and the clad glass index to be greater than the core glass index at the signal wavelength where anti-index gain guiding is desired. FIG. 8 is a graph showing the difference in refractive index for a core index and a clad index over a range of wavelengths.

This index dispersion works well in doping materials like Thulium and Erbium where the pump and signal wavelength are far apart in wavelength. The main issue with the cross over pumping, especially in purely anti-index gain guided fibers is that there must be enough gain per unit length, pump absorption per unit length, to provide gain guiding and further support lasing in the fiber.

In traditional index guided fibers the pump light absorption per unit length is low because the core to cladding ratio is small, and the power per unit length absorbed goes as a function of the square of the ratio. To have a reasonably large fiber and still single mode core in a conventional index guided fiber the core to clad size ratio must be large.

This is not the case in a gain guided fiber, since the gain guided fiber can be made single mode for core sizes of upwards of 100 microns. Large cores allows for small core to clad ratios and hence higher pump per unit length absorption for an end pumped crossover fiber.

This crossover principle that works for a purely gain guided laser also works in a hybrid design, since the hybrid design is already end pumped. Having a crossover index dispersion design in the hybrid fiber allows an "all fiber" design by replacing the gain guiding module pumped with a diode bar with a crossover index gain guiding fiber that would be pumped by the same wavelength light as the rest of the fiber laser. If possible at the desired wavelength, the crossover effect is the method of choice for a hybrid fiber laser because the residual pump from pumping the multimode fiber would contribute to the laser as a whole. An added benefit of the hybrid design is that the lasing does not hinge on the gain guided portion of the fiber. This means that only enough pump light must be applied to the gain guiding section to achieve gain guiding effects and not complete inversion and lasing. The crossover design should work for any laser ions in a fiber provided a glass with the desired dispersion characteristics can be produced.

An additional possibility for pump coupling into gain guiding fiber is the idea of evanescent coupling of light directly into the core of the fiber. For this process, the fiber is polished down to its core and placed directly on a semiconductor device or other optical fiber. Due to the effects of evanescent coupling between contacting waveguides light is then coupled into the core and hence induce gain guiding. The evanescent coupling effect has been investigated when one considers launching pump light into the cladding of a standard optical fiber, so the technique works similarly for the core. The issue with evanescent coupling is whether or not enough pump light can be coupled into the gain guided fiber to induce the effect. A related technique to the evanescent coupling is the idea of etching groves into the gain guided fiber to allow light to be injected directly into the core. The benefit of these evanescent schemes is that they are compact and require little aligmnent, especially compared to the bulk gain guided module. If fiber to core evanescent coupling is accomplished, it is also possible that these methods lead to an all fiber system which, unlike the crossover technique, would not require specialty glasses to function.

Another embodiment provides a multimode hybrid laser 900 having a multimode resonator cavity and involves aligning multiple gain guided fibers each coupled at both ends to a multimode fiber 910, the gain guided 940 and multimode filers adjacent to each other with the opposite ends of the multimode fiber coupled together in a zig-zag manner forming adjacent sections of gain guided and multimode filers 910 and 940. The multimode laser system 900 uses several gain guiding sections 940 to reduce the higher order modes in a conventional fiber. Having several sections of gain guided fiber 940 next to each other effectively increases the absorption length for pump light 920 from a single diode and allows more efficient use of the pump light. The gain guided section could be bundled together or even embedded in a large piece of glass or other transparent material to form a resonator cavity. The resonator cavity is pumped with side diode bars 925. The fibers could be made in any shape to enhance their packing and improve pumping efficiency and the fibers may be pumped in a pump chamber much like the one previously described. Doped conventional fiber would then be spliced to each piece of gain guided fiber to complete a resonator. This conventional fiber can be end pumped and can be made very long to allow spreading of heat load.

Hybrid gain guiding stretches past the bounds of just fiber lasers. As previously discussed, a glass rod with gain guiding effects is incorporated into a solid state laser system to increase the beam quality. Hybrid gain guiding came about as the result of glass fiber research, but the effect exists in any wave guiding structure with gain. Progress in the art of ceramic and crystal fibers leads to the ability to introduce gain guiding into these structures as well as into bulk ceramic or crystal rods when proper doping profile and index is used.

One could conceive a flowing liquid or gas gain medium structure in a glass tube of sorts. If the tube system is designed for wave guiding, it allows the gain guiding effect to take place with the proper index liquid or glass and sufficient pumping and thus gain in the medium. In fact, gasses lend themselves to anti-index gain guiding since gasses already have a low index. An additional benefit of gain guided gas cells is their ability to be electrically pumped. Electrical pumping is easier to spread over a long gain guiding region to induce the gain guiding effect. A high index liquid in a glass tube could likewise act as an anti-index gain guided medium. These two gain guiding structures expand the reach of the hybrid gain guiding structures because they allow for wavelengths that are not yet available in the solid state realm. A gas or liquid gain guiding element is introduced into an existing laser cavity to reduce the high order modes in much the same way an iris would be.

Figure 9:
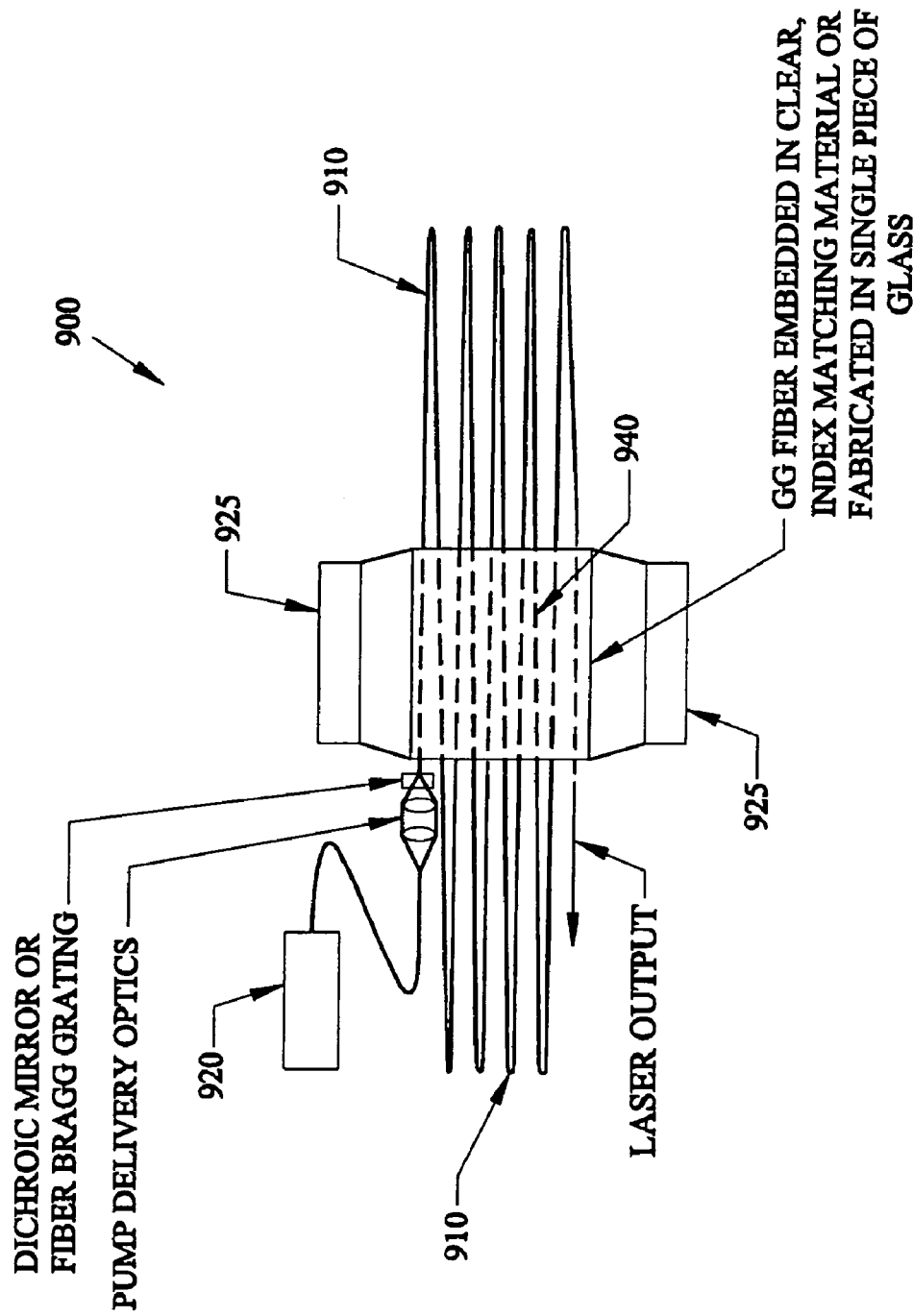
FIG. 9 is a schematic of a basic VCSEL-like gain guiding element for semiconductors.
Figures 10A, 10B:
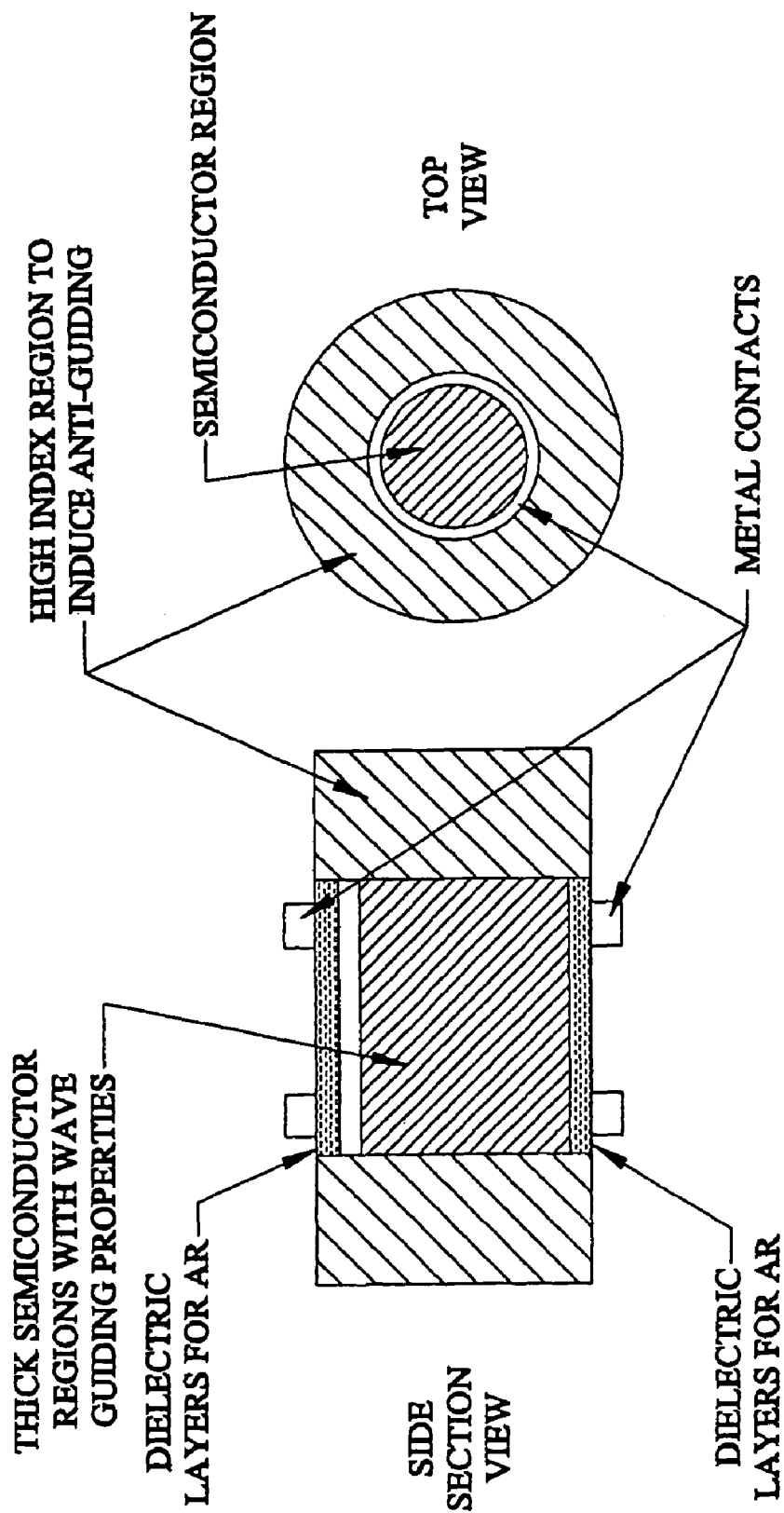
FIG. 10a and FIG. 10b is a cross sectional view and a top view of the semiconductor of FIG. 9.

If electrically or optically pumped semiconductors are shaped into single mode round wave guiding structures they too could be used as the introduced gain guiding element in a hybrid laser cavity with single mode round beam quality. In fact, a device with a vertical-cavity surface-emitting laser (VCSEL) like structure embedded in a higher index semiconductor to attain anti index guiding is perfect to integrate into a hybrid system. The benefit of electrically pumped semiconductors is the ease of pumping to induce the uniform gain and the relatively broad range of available wavelengths. FIG. 9 is a schematic for a basic VCSEL-like gain guiding element for semiconductors.

Because the hybrid gain guiding design can be used in almost any conceivable laser configuration where a wave guiding element is used it is clear that it can be used with a huge range of dopants or output wavelengths. Any rare earth ion can be used to dope a gain guided fiber laser system and hence provide emission from approximately 1 micron (Nd, Yb) to approximately 4.5 microns (Tb) in wavelength from ions like Sm, Pr, Ho, Tm, Er, Yb, Nd, and Tb for example. Most rare earth ions have already been made into fiber lasers, so they could clearly be made into gain guiding and hybrid fiber lasers. These rare earth ions could also be easily doped into any ceramic or crystal gain guided system.

Other crystal types are possible when their host crystal is doped to have a gain guided structure. If Ti.Saphire, Cr:LiSAF, alexandrite, ruby or any other crystal is manufactured to have a wave guiding structure with negative index difference or be immersed in a higher index medium, these would also make gain guided elements for hybrid gain guided lasers. The ability to use semiconductors as gain guiding elements also opens a host of possibilities. GaAs and InP based lasers enable the red and near IR and perhaps in GaN lasers are producible; blue lasers would be existent in the realm of gain guided hybrid elements.

Liquid and gas wave guiding structures with gain enable even further reach for the gain guiding hybrid technique. If a $CO_2$ based gain guiding module is designed, it would enable much higher beam quality in current lasers. Argon, Krypton, HeNe, HeCd, copper vapor and even any of the excimer based laser systems are also candidates for gain guiding when sufficiently high gain in a gas cell is induced. Even terahertz frequencies might be reachable by gain guiding by way of optically pumped molecular gas lasers. These rely on molecular gasses like methanol to produce terahertz, which is guided in a quartz tube. When a gain guiding effect in the gas is established, even single mode terahertz lasers are produceable. Rhodamine 6G (R6G), fluorescein, coumarin, stilbene, umbelliferone, tetracene, malachite green among many others could be used in hybrid dye based configurations where a gain guiding element is produced by flowing the dye through a tube, making the waveguide and hence gain guiding element.

A final potential use of gain guiding fiber as a section of a conventional laser, a hybrid design, is the use of gain guided section as a Q-Switch to produce short, high power pulses. Because the gain guided fiber only guides when it is pumped, the Q of a laser cavity is modulated by simply modulating the pump pulses of the gain guiding pump diodes. When the diodes are off, the gain guiding fiber sections do not guide, and hence the laser cannot resonate, when the diodes are turned on briefly, a pulse builds up and a short, high peak power pulse is emitted. Because gain guiding allows very large core fibers with excellent beam quality, using the pump diodes to Q switch the cavity allows higher peak powers with diffraction limited beam quality from a fiber laser. In addition, Q switching in this way allows both CW and Q Switched operation, by simply choosing the mode the pump diodes for the gain guiding sections operate in. If a laser with multiple gain guiding sections is used, the amount of "hold off" of the Q-switch is improved.

In summary, gain-guiding is a new architecture for creating large low order mode areas in fiber lasers. Gain-guided fiber lasers require the use of special fibers, and suffer from pumping difficulties and thermal issues when used on their own. Large mode area fibers allow the development of lasers with very high powers, high efficiency, simple construction and compact size. The Hybrid Gain Guiding according to the present invention permits the use of gain guiding with conventional large fibers that normally would operate in the multimode regime or if single mode, not be capable of handling high peak powers.

Overall, any gain medium that can be used in a wave guiding structure with high enough gain can be used to for the gain guiding element of a hybrid gain guiding laser. Making such a gain guiding element and inserting it into a cavity with multiple modes allows for high quality output beams in almost any high power laser currently in existence, as the gain guiding effect in the gain guiding element induces loss in high order cavity modes.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A gain guided hybrid laser having a multimode laser resonator with hybrid gain guiding in the multimode laser resonator comprising:
    a large core multimode fiber as a gain medium for the hybrid laser;
    a pump source at a first end of the multimode fiber to pump light into a cavity of the multimode fiber laser;
    a gain guiding element coupled with a second end of the multimode fiber to induce loss on high order modes to allow only one single mode to transmit through the gain guiding element without loss, the gain guiding element selected from a group consisting of an anti guided fiber and plural serially coupled gain guiding elements along the length of the fiber laser to add losses on the high order modes, each pumped by a corresponding pump source;
    a main pumping source for pumping the gain guiding element to produce a gain guided laser, wherein the gain guiding provides a single mode output; and
    an output coupler for coupling a single mode output.

2. The laser of claim 1, wherein the multimode fiber comprises:
    a photonic crystal fiber having an air cladding to improve pump light coupling and absorption and improve thermal properties of the fiber.

3. The fiber laser of claim 1, wherein the length of the large core multimode fiber is selected to provide a desired gain and to spread pump light over a length to reduce thermal effects.

4. The laser of claim 1, wherein the gain guiding elements is placed into a laser cavity to allow the output to be reduced to single mode.

5. The hybrid laser of claim 1, wherein the pumping source comprises:
    an external pump for pumping the gain guiding element.

6. The hybrid laser of claim 1, wherein the main pumping source for pumping the gain guiding element comprise:
    an end pump source coupled with an opposite end of the gain guided element for pumping the gain guiding element to allow the gain guided element to lase and gain guide, the first end of the gain guided element spliced with the second end of the multimode fiber and the second end of the gain guided element coupled with the end pump source.

7. The hybrid laser of claim 1, wherein the gain guided hybrid laser is a gain guided hybrid fiber laser.

8. The hybrid laser of claim 1, wherein the gain guided hybrid laser is a gain guided hybrid solid state laser system.

9. The hybrid laser of claim 1, wherein the pump source comprises:
    a diode pump; and
    an optical device for coupling the diode pump to the multimode fiber.

10. The hybrid laser of claim 9, wherein the optical device is selected from a group consisting of a dichroic mirror and a fiber grating.

11. The hybrid laser of claim 1, further comprising:
    a side pump source coupled along a length of the gain guided fiber.

12. An end pumped hybrid gain guided laser comprising:
a large core multimode fiber as a gain medium;
a section of gain guided fiber having a gain at the laser wavelength coupled with one end of the large core multimode fiber;
a diode pump source coupled with the opposite end of the large core multimode fiber,
a second diode pump source coupled with an output end of the section of gain guided fiber;
a second coupler coupling the second diode pump source with the section of gain guided fiber; and
a pump coupler coupling the diode pump source to the large core multimode fiber, wherein unabsorbed pump light in the gain guided fiber continues to pump the end pumped hybrid gain guided laser to induce a gain guiding effect in the large core laser fiber to provide a fiber based system without an external pump module.

13. The hybrid gain guided laser of claim 12, further comprising:
free space coupling optics for coupling the diode pump source with the multimode fiber.

14. A gain guided hybrid laser having a multimode laser resonator with hybrid gain guiding in the multimode laser resonator comprising:
a large core multimode fiber as a gain medium for the hybrid laser;
a pump source at a first end of the multimode fiber to pump light into a cavity of the multimode fiber laser;
a gain guiding element coupled with a second end of the multimode fiber to induce loss on high order modes to allow only one single mode to transmit through the gain guiding element without loss;
an end pump source coupled with an opposite end of the gain guided element for pumping the gain guiding element to allow the gain guided element to lase and gain guide, the first end of the gain guided element spliced with the second end of the multimode fiber and the second end of the gain guided element coupled with the end pump source, the gain guiding providing a single mode output; and
an output coupler for coupling the single mode output.

* * * * *

UNITED STATES PATENT AND TRADEMARK OFFICE
CERTIFICATE OF CORRECTION

PATENT NO. : 7,881,347 B2
APPLICATION NO. : 12/032081
DATED : February 1, 2011
INVENTOR(S) : Timothy McComb et al.

It is certified that error appears in the above-identified patent and that said Letters Patent is hereby corrected as shown below:

Column 1, line 7; insert;

--STATEMENT REGARDING FEDERALLY SPONSORED RESEARCH OR DEVELOPMENT

The subject invention was made with government support under Account No. 65018200 MRI Fiber Laser Contract through Clemson University with DoD JTO, HEL Office. The government has certain rights in this invention.--

Signed and Sealed this
Fifteenth Day of March, 2011

David J. Kappos
*Director of the United States Patent and Trademark Office*